(No Model.)
G. LAUBE.
EXTENSION STOVEPIPE JOINT.
No. 514,857. Patented Feb. 13, 1894.
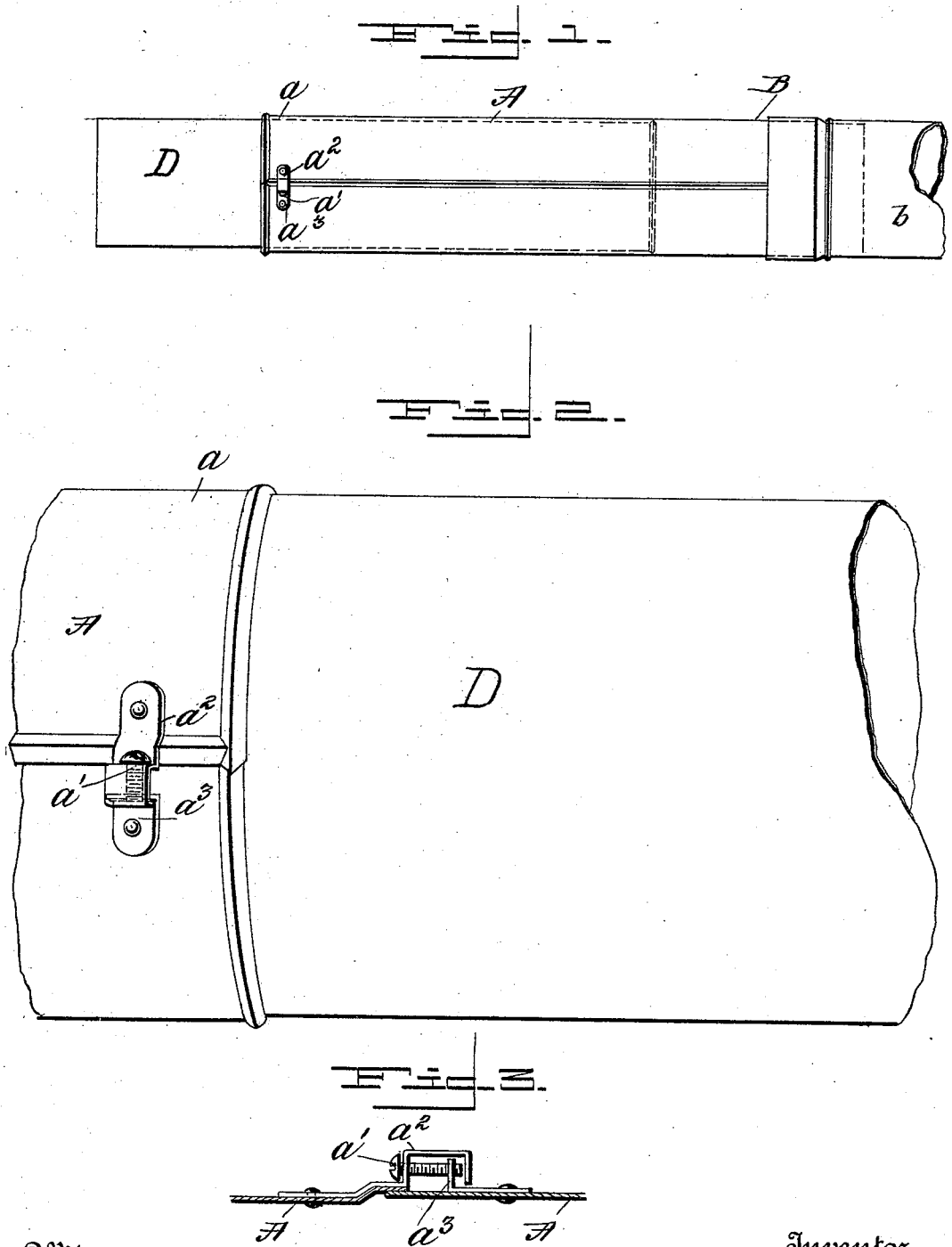

UNITED STATES PATENT OFFICE.

GODFRIED LAUBE, OF HURON, SOUTH DAKOTA, ASSIGNOR OF ONE-HALF TO JOSEPH HYMANS, OF CHICAGO, ILLINOIS.

EXTENSION STOVEPIPE-JOINT.

SPECIFICATION forming part of Letters Patent No. 514,857, dated February 13, 1894.

Application filed July 3, 1893. Serial No. 479,471. (No model.)

*To all whom it may concern:*

Be it known that I, GODFRIED LAUBE, a citizen of the United States of America, residing at Huron, in the county of Beadle and State of South Dakota, have invented certain new and useful Improvements in Extension Stovepipe-Joints, of which the following is a specification, reference being had to the accompanying drawings.

This invention relates to stove pipe joints and particularly to extension joints.

The object of the invention is to provide means whereby pipe joints may be made to telescope one within the other allowing for longitudinal adjustment of the joints and also to arrange that they may be varied diametrically to fit pipes of different dimensions; furthermore to provide means for fastening the outer joint securely around the inner, to retain them in their adjusted position.

With these and other objects in view the invention consists in various novel details of construction, arrangement and combination of parts, to be hereinafter more particularly described and shown.

In describing the invention in detail, reference is had to the accompanying drawings forming a part of this specification wherein like letters of reference indicate corresponding parts in the several views, in which—

Figure 1. is a view in side elevation showing the reduced end attached. Fig. 2. is an enlarged view in side elevation, partly in perspective, showing the securing piece in place. Fig. 3. is a detail view of the securing device.

In the drawings, A, indicates the outer joint of a stove pipe provided at the end $a$, with loose seams adjustably held in position by means of the set screw $a'$, working in the threaded apertures of the lugs $a^2$, $a^3$, which are secured at opposite edges of the seams. The lug $a^2$, has a right angular extension which passes over the lug $a^3$, said extension having its end turned down forming an approximate staple, as shown in Fig. 3. The advantages of this peculiar construction will be obvious since it prevents the parts from springing apart, and allows ready securement and adjustment of the pipe diametrically for the purpose of admitting the section of the pipe that shall be fitted therein.

The adjustment herein described has its advantages in facilitating the fitting of pipe to stoves, in connecting pipe joints and in securing them in a safe and ready manner, as the inner joint may be of any diameter less than that of the expanding capacity of the outer, and may vary in size, yet the outer joint can be made to fit it securely.

The opposite end of the pipe has a reduced portion B, adapted for ordinary use in making pipe connections which I accomplish by reducing the joint itself, or by annexing, by rivets or otherwise, a section having a contracted end as shown in Fig. 1.

The manner in which the longitudinal adjustment is made will be apparent, and the operation of the device will be readily understood from the foregoing description.

Having fully described my invention, what I claim as new, and desire to obtain by Letters Patent, is—

A stove pipe section having expansible joints, the lugs $a^2$, $a^3$ secured at the edges of said joints and having threaded apertures for the reception of a set screw, the lug $a^2$ having a right angular projection with a downwardly extending end, substantially as described and for the purpose set forth.

In testimony whereof I affix my signature in presence of two witnesses.

GODFRIED LAUBE.

Witnesses:
HATTIE ROSE LAUBE,
ANNIE T. LAUBE.